United States Patent [19]

Ollivier

[11] Patent Number: 4,471,803
[45] Date of Patent: Sep. 18, 1984

[54] FLOW LIMIT SHUTOFF VALVE

[75] Inventor: Louis A. Ollivier, Palo Alto, Calif.

[73] Assignee: Veriflo Corporation, Richmond, Calif.

[21] Appl. No.: 355,532

[22] Filed: Mar. 8, 1982

[51] Int. Cl.³ ..................... F16K 17/20; F16K 17/32
[52] U.S. Cl. .................... 137/462; 137/614.21; 137/501
[58] Field of Search .............. 137/501, 505, 462, 461, 137/498, 495, 503, 460, 487

[56] References Cited

U.S. PATENT DOCUMENTS

| | | | |
|---|---|---|---|
| 2,209,956 | 8/1940 | Chase et al. | 251/335 A |
| 2,227,297 | 12/1940 | Coy | 137/462 |
| 3,538,951 | 11/1970 | Bownass | 137/614.21 |

Primary Examiner—Martin P. Schwadron
Assistant Examiner—John Starsiak
Attorney, Agent, or Firm—Owen, Wickersham & Erickson

[57] ABSTRACT

A flow limit shutoff valve for automatically shutting off all flow between a source of high-pressure gas and a pressure regulator when that flow exceeds a preset flow rate. The flow to the shutoff valve is metered, resulting in lowering the pressure downstream from a metering valve. A main valve has a first chamber on one side downstream from the metering valve, and the valve's outlet is connected to this first chamber. A second chamber on the opposite side is connected to the inlet pressure. The main valve is biased in the opposite direction from that urged by the inlet pressure, so as normally to keep it open, but the main valve snaps shut when the inlet pressure forces overcome the sum of the downstream gas pressure forces and the biasing forces. To enable reopening, a bypass system connects the upstream side of metering valve to the first chamber, while there is a manually operated closure for manually opening and closing off the bypass to the first chamber.

9 Claims, 4 Drawing Figures

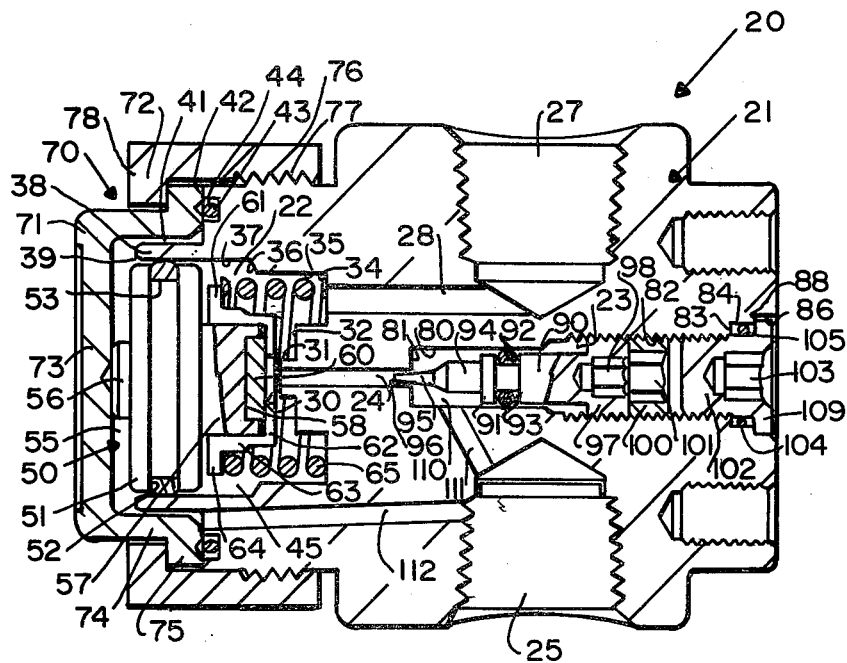

FLOW LIMIT SHUTOFF VALVE

This invention relates to a flow limit shutoff valve for automatically shutting off all flow between a source of gas at elevated pressure and a pressure regulator, doing so when the flow exceeds a preset flow rate.

BACKGROUND OF THE INVENTION

The valve of this invention is a safety valve which is used, for example, between a gas cylinder of gas at very high pressure and the inlet of a pressure regulator. It is also used, or it can be used, in the low-pressure delivery line from a pressure regulator to a system using gas at the regulated pressure. In each instance the valve of this invention is used to shut off automatically the flow of gas when the flow exceeds some predetermined rate.

Whether used between a cylinder of high pressure gas and a pressure regulator inlet or used beyond the pressure regulator, the valve of the invention senses the flow as an interposed pressure drop and, when the preset differential pressure limit is exceeded, closes with a snap action, preventing flow by making a leak-tight seal.

The problem to which the invention is directed is therefore primarily that of preventing accidents and damage to equipment resulting from excessive flow of gas under pressure.

It is also important, of course, to be able to resume flow, and the invention makes it very simple to do that.

Other objects and advantages of the invention will become apparent from the following description.

SUMMARY OF THE INVENTION

The invention provides a flow limit shutoff valve for automatically shutting off all flow between a source of high-pressure gas and a pressure regulator when that flow exceeds a pre-set flow rate. The valve has an inlet for gas under pressure, and a metering valve is connected to the inlet for metering the flow rate to a conduit downstream from the metering valve, thereby producing a pressure drop. A main valve portion has first and second chambers on opposite sides of a piston, diaphragm, or other movable valve member. The first chamber is downstream from the metering valve and provides a closure seat, while the second chamber is a dead end connected directly to the inlet at inlet pressure. The outlet for flow leads out from the first chamber. Biasing means, for this main valve, such as a compressed spring, applies a predetermined amount of force in the opposite direction from that which the inlet pressure exerts in the second chamber, thereby keeping the main movable valve member away from its seat so long as the sum of forces from the biasing means and the gas pressure in the first chamber are greater than the forces exerted in the second chamber by the inlet pressure. Closure results when that sum is less than the forces exerted on the main valve member by the inlet pressure in the second chamber.

Re-opening of the main valve is accomplished with the aid of a bypass system connecting the upstream side of the metering valve to the main valve's first chamber. A closure valve normally closes off the bypass means from the main valve's chamber, but it can be opened manually to re-activate the main valve and is then reclosed.

The flow limit shutoff valve of this invention preferably has a valve body with an axially extending opening defining a wide main valve cavity at one end, a smaller-diameter metering valve cavity at the opposite end, and a narrow interconnecting passage connecting the two cavities and serving to admit high-pressure gas to the first chamber of the main valve. The main valve cavity has an annular seat concentric with the interconnecting passage, which enters the main valve cavity at and through the seat. The seat may be surrounded by a concentric well having an annular shelf leading radially out to an outer wall of the well. The main valve cavity is preferably surrounded by an outer annular shelf. The metering valve cavity includes a smooth axial bore extending in to an annular end wall concentrically surrounding one end of the interconnecting passage.

The valve body also has three radially inwardly extending openings which are angularly separated from each other. A first opening provides a valve inlet for connection to a source of gas under pressure, typically either a cylinder of high pressure gas or the outlet from a gas-pressure regulator. An inlet-flow passage in the body leads from the inner end of the first opening into the axial bore of the metering valve cavity. The second opening contains the closure valve for opening and closing the by-pass system and is used for starting or re-starting the flow of gas through the metering valve. Thus, a first by-pass conduit leads from the axial bore of the metering valve into the second opening, and a second by-pass conduit leads from the second opening into the main valve's first chamber. The closure valve separates or joins the two by-pass conduits, depending on the position of the closure valve. The third opening provides the valve's outlet and is connected to the well by an outlet passage.

Cooperating with the main valve cavity is a main valve comprising a movable member for enclosing and varying in size the first chamber and having an end seal facing the seat on the body. The movable member is preferably a piston when high pressures are involved and a diaphragm when the valve is used with somewhat lower pressures. The interconnecting passage leads from the metering valve bore into the first chamber, and so does the second by-pass conduit, while the outlet passage leads out from it. Also in the first chamber is a spring with one end bearing against the well shelf. This spring tends to force the movable main valve member away from the body's seat and to keep the main valve open. A closure cap covers the movable valve member and is secured to the body, cooperating with the body and movable member to provide the second chamber, which is connected to the inlet at inlet pressure.

In the metering valve cavity is a metering valve member having a tapered stem with a narrow portion extending into the interconnecting passage, for flow therearound from the metering cavity into the interconnecting passage and on to the main valve cavity, thereby producing a pressure drop. A wider portion of the metering valve member engages the smooth bore, on the opposite side of the inlet passage and the first by-pass conduit from the end wall. The metering valve member is adjustable as to position to regulate flow and pressure drop.

In the second opening, the closure valve assembly includes a diaphragm seated on a shoulder of the body. The actual closure member is in an inner bore of this second opening and has an inner end able to close off the first bypass conduit from the second by-pass conduit. A head at its outer end bears against the diaphragm, and a spring around the closure member urges it normally away from closure. A control member on the opposite side of said diaphragm from the closure valve has a head bearing against the diaphragm and can be moved to act, through the diaphragm, to force the closure valve to close off the two by-pass conduits from each other.

BRIEF DESCRIPTION OF THE DRAWINGS

FIG. 1 is a view in longitudinal section of a flow limit shutoff valve embodying the principles of the invention. This particular valve is of the type that is used between a cylinder of high-pressure gas and a pressure regulator.

FIG. 2 is a view in section taken at right angles to FIG. 1 showing only half of the device.

DETAILED DESCRIPTION OF TWO PREFERRED EMBODIMENTS

Figure 4:
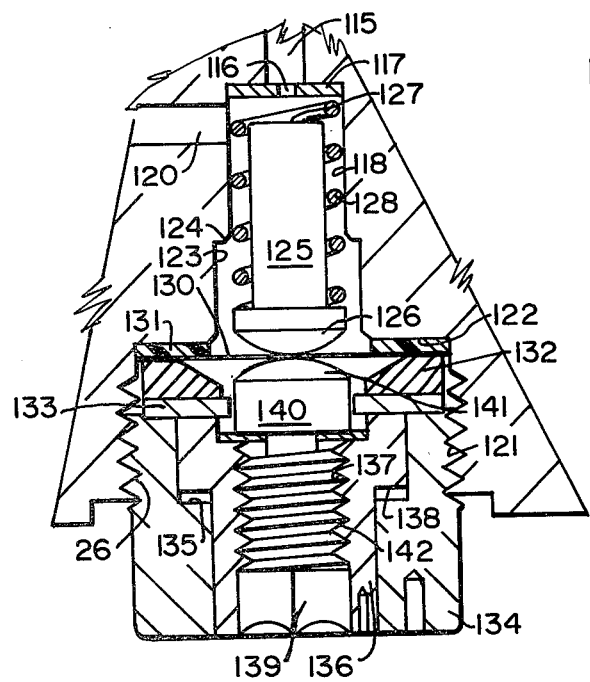
FIG. 4 is an enlarged view in section of a portion of FIG. 2.

The valve 20 of FIGS. 1, 2, and 4

The valve 20 of FIGS. 1, 2, and 4 is the type that is preferably used between a cylinder of high pressure gas and a pressure regulator. In this form of the valve, considerable pressure, up to two or three thousand pounds per square inch of pressure, is exerted at its inlet.

The valve 20 has a valve body 21 which at one end has a main valve cavity 22 and at the opposite end a metering valve cavity 23, the cavities 22 and 23 being connected together by an interconnecting passage 24. The valve body 21 also has three radially inwardly extending openings 25, 26, and 27, all angularly separated from each other. The first opening 25 (see FIG. 1) is connected to the high pressure source of gas, the second opening 26 (see FIG. 2) contains a restarting mechanism, and the third opening 27 (see FIG. 1) connects an outlet 28 from the main valve cavity 22 to the pressure regulator or the like.

In the main valve cavity 22, the body 21 has a seat 30 which is concentric with the interconnecting passage 24 and partially defined by a cylindrical outer periphery 31 leading axially inwardly to an annular shelf 32, beyond which a second cylindrical periphery 33 (see FIG. 2) leads to a shelf 34 at the bottom of a well portion of the cavity 23. From the shelf 34 a concentric cylindrical wall 35 leads axially outwardly to an offset 36, which ends at a concentric cylindrical wall 37 of greater diameter which is partly defined by an extension portion 38 of the body 21, ending at an outer end 39. On the opposite side from the cylindrical wall 37 is an outer, concentric cylindrical wall 41 which lies outside the cavity 22. This wall 41 leads back to an outer annular shelf 42 having a recess 43 therein for receiving a sealing member 44.

Closing the main valve cavity 22 and defining with it a first valve chamber 45 is a main valve member 50 having a large diameter piston portion 51 which is provided with an O-ring recess 52. An O-ring 53 therein seals against the cylindrical wall 37 and separates the first valve chamber 45 inside from the second chamber 55 outside the valve. As the piston 51 moves in accordance with gas pressure, it is this sealing O-ring 53 which marks the boundary between the chambers 45 and 55 at all times. Beyond this large portion 51, is a reduced diameter outer portion 56 and on the piston's inner side is a reduced diameter cylindrical portion 57 having a cylindrical recess 58 for an elastomeric seat 60, which faces the body seat 30 and can be compressed against it to close off the passage 24 from the first chamber 45.

Although there are several ways of holding the seat 60 in its recess 58, the one good way is to provide an encircling generally axially extending annular member 61 having an annular radially inwardly extending flange 62 engaging the outer peripheral portion of the seal 60. The member 61 has an axial portion 63 and a cylindrical outwardly extending flange 64 against which one end of a spring 65 bears. The other end of the spring 65 bears against the shelf 34.

Enclosing the end of the second chamber 55 is a cap 70 preferably made in two pieces 71 and 72. The piece 71 has a disc end wall 73 with an axial flange 74 surrounding the extension 38, spaced from the outer wall 41 thereof and followed by a short radially outwardly extending flange 75, bearing against the seal 44.

The cap piece 72 is mainly an interiorly threaded axial collar 76 threaded onto exterior threads 77 of the body 21 and having a radially inwardly extending flange 78 bearing on the flange 75 and forcing it to seal against the seal 44.

The metering valve cavity 23 includes a smooth axial bore 80 with an end wall 81 through which the interconnecting passage 24 leads. In the opposite direction from the interconnecting passage 24, the bore 80 leads to an enlarged threaded portion 82, which ends with a radial offset 83, a short cylindrical bore 84, a second offset 85, and a short cylindrical recess 86 (see FIG. 2).

In this metering valve cavity 23 is a metering valve member 90 which is cylindrical and has a piston portion 91 having an O-ring 92 in a recess 93. The O-ring 92 bears against and seals against the smooth axial bore 80. Forward of the piston portion 91, the valve member 90 has a stem 94 which leads to a tapered nose 95, the diameter of which varies from its end 96 being substantially smaller than the diameter of the interconnecting passage 24 to a portion outside the passage 24 that is larger than the diameter of the passage 24 and is therefore able to close off the passage 24. However, the passage 24 is not closed off under normal use.

The metering valve member 90 also has a threaded head 97 which engages the threads 82 and has an Allen head 98 for insertion of an Allen wrench. Bearing against the head 97 of the metering valve member 90 is a lock-nut 100 which preferably also has an Allen head 101 requiring a different size of Allen wrench. This requirement of different sizes of wrenches helps to prevent tampering by unauthorized individuals. The cavity 23 itself is closed at the end by a nut 102 which is threaded into it and also has an Allen head 103. Sealing is assured by a Teflon gasket 104 in a space 105 defined between the nut 102 and the body 21. Before anyone can change the setting of the metering valve 90 he must first remove this outer nut 102 and then the lock nut 100 and then change from one Allen wrench to another for use on the valve member 90.

The function of the metering valve 90 is to meter the gas flow to the first chamber 45 and thereby also to define the pressure drop between the inlet 25 and the first chamber 45.

High-pressure gas from the inlet 25 is sent into a metering valve chamber 110 (lying between the O-ring 92 and the end wall 81) via an inlet passage 111. The inlet pressure is also transmitted directly to the second chamber 55 by a passage 112.

A first by-pass conduit 115 (FIGS. 2 and 4) leads from the metering valve chamber 110 into the inner end of the second opening 26, where it passes (see FIG. 4) through a reduced-diameter opening 116 in a washer 117 into a smooth bore 118 of the opening 26. Leading radially from the bore 118 is a second by-pass conduit 120 which leads to and through the well shelf 34 into the first chamber 45. Starting from the outside, the second opening 26 has an interiorly threaded portion 121 leading in to a shoulder 122. The shoulder 122 extends radially inwardly into a bore 123, from which another shoulder 124 leads into the inner bore 118.

A closure member 125 inside the bore 118 has a head 126 at its outer end in the bore 123, while its inner end 127 can and normally does bear against the washer 117, closing the opening 116, thereby cutting off the flow between the two by-pass conduits 115 and 120 by closing off the end of the first by-pass conduit 115. A spring 128 urges the member 125 outwardly by pressing against its head 126. The head 126 is rounded and bears against a diaphragm 130 that is seated on a Teflon gasket 131 which rests on the shoulder 122. On the opposite side of the diaphragm 130 is a shaped annular diaphragm plate 132, the shaping being to accommodate outward movement of the diaphragm 130.

On the outer side of the diaphragm plate 132 is a washer guide 133, and beyond that a stepped nut 134 having an inner shoulder 135 is threaded into the threaded portion 121 of the opening 26 and bears against the washer guide 133, which, in turn, bears against the plate 132 and holds the diaphragm 130 in place. The stepped bore of the nut 134 accommodates an Allen nut 136 having a threaded inner portion 137 and an outer shoulder 138 that faces the shoulder 135. It has an Allen head 139 to receive an Allen wrench. A bearing member 140 with a rounded head 141 bears against the diaphragm 130 and has a threaded portion 142 that is moved inwardly and outwardly by rotation of the nut 136. When the member 140 is forced inwardly, it actuates the closure member 125, and when it is retracted, the spring 128 forces open the closure member 125. The member 140 is guided within the washer guide 133, so that it will not rotate during its axial movement which is caused by rotation of the Allen nut 136. For example, the portion of the member 140 adjacent to the guide 133 may be polygonal or have a pair of flats, and the guide 133 may have the same configuration.

In operation, the metering valve 90 is set to produce a desired flow, and when the main valve 50 is opened (in the same manner as when it is reset, described below) then the inlet pressure from a compressed-gas cylinder (not shown) is applied both to the inlet passage 111 and to the second chamber 55 via the passage 112. From the inlet passage 111 and the bore 80 to the connecting passage 24 there is a pressure drop around the metering valve nose 95. The difference between the two gas pressures on the opposite sides of the piston 51 is determined by the metered flow which causes the pressure drop, so that the pressure of the fluid entering the first chamber 45 is somewhat less than that applied to the second chamber 55 in the opposite side of the valve 50. This is overbalanced by the force of the spring 65, which urges the valve open and keeps it that way so long as fluid is flowing. The by-pass conduit 115 is shut off during operation. The flow from the inlet 25 therefore goes via the passage 111 into the bore 80, into the intermediate passage 24 and thence into the first chamber 45 and from there into the outlet passage 28 and to the outlet 27 and on to the pressure regulator (not shown).

If this flow should for any reason become excessive, then the increase in flow causes the pressure drop to become greater until the spring 65 is unable to hold the main valve 50 open, and it snaps shut, urged by the inlet pressure in the second chamber 55.

After the valve is once shut, it stays shut until purposely opened. To do this or to commence operation of the valve, use is made of the apparatus in the second opening 26. The closure member 125 is then in its normally closed position. To open it, one turns the Allen nut 136 to retract the member 140, and then the spring 128 urges the member 125 away from the first bypass conduit 115 at the opening 116 and sends gas at inlet pressure into the second bypass conduit 120. Then the gas at inlet pressure passes into the main valve chamber 45. This pressure is added to the force of the spring 65 and forces the piston 51 to move outwardly and open the valve 50. Once this is done, unless something is wrong that has not been corrected, the flow of fluid through the metering valve bore 80 and the interconnecting passage 24 will leave the main valve 50 open. Therefore, the bypass closure member 125 is closed at once.

Figure 3:
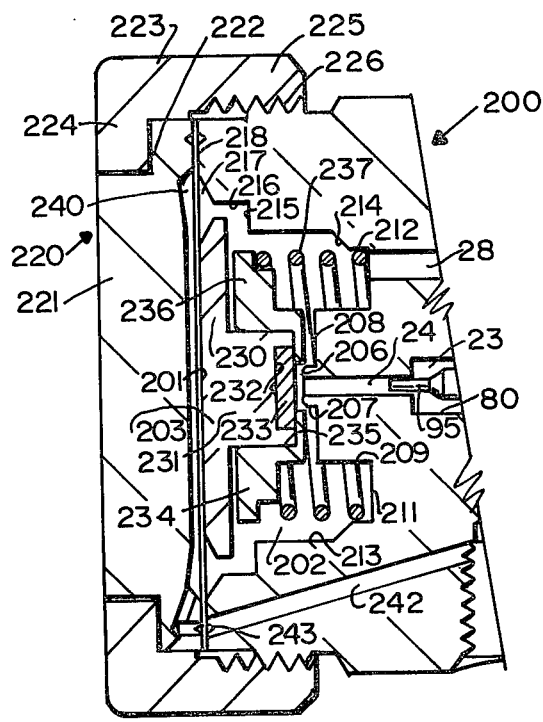
FIG. 3 is a view similar to FIG. 1 of a modified form of flow limit shutoff valve embodying the principles of the invention, directed particularly for use with lower pressure gas, such as gas flow beyond a pressure regulator.

The valve 200 of FIG. 3

The valve 200 is basically the same as the valve 20 except that it is devised for use at relatively low pressure, as beyond the regulator. Therefore, there would not be sufficient pressure to operate a piston-type of valve, and a wide diaphragm 201, substantially wider than the piston valve 50, is employed, as shown in FIG. 3. This means that a main valve chamber 202 of somewhat different shape is used and that a valve 203 driven by the diaphragm 201 is used. Otherwise the valve remains the same in every particular.

The main valve chamber 202 again has a cylindrical seat 206 with a front face and a cylindrical rim 207, an annular shelf 208 surrounding that rim 207 and leading to an inner wall 209 of the well of the first chamber 202. The well, once again, has a shelf 211 and on its outer side there may be spring-confining portion 212 leading to a wider portion 213 as by a frustoconical portion 214, and, at the outer end of this wider portion 213, there is a shoulder 215 leading out to a still wider portion 216 from which a frustoconical portion 217 leads to an axial outer shelf 218.

The diaphragm 201 (which may be a fluoropolymer) is clamped onto this shelf 218 by a cap 220, which, again, may be a composite member in order to hold the cap and diaphragm firmly without twisting the diaphragm 201. In this instance it may comprise a disc 221 with a step or shoulder 222, which clamps the diaphragm 201 to hold it tight. An outer ring or collar 223 has an inwardly extending flange 224 to engage the shoulder 222 of the disc 221, and an interiorly threaded portion 225 to engage the outer threads 226 of the body.

Inside the first chamber 202 as defined by the diaphragm 201 is a large diaphragm plate or disc 230 having a smaller reduced diameter portion 231, on the end 232 of which is a resilient seal 233. A spring collar 234 may be employed to fit smoothly around the exterior of this inner cylindrical portion 231, having an inwardly extending flange 235 to hold the seal 233 in place and protect it, and also having an outer portion 236 where the spring 237 bears against it.

A small second chamber 240 on the outer side of the diaphragm 241 between it and the cap 220 is connected to a passage 242 leading from the inlet opening to conduct the gas at inlet pressure through a hole 243 in the diaphragm 201 near its outer periphery into this outer chamber 240 to exert pressure on the diaphragm 201. Operation is the same as before, except that there is a diaphragm instead of a piston.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A flow limit shutoff valve, including in combination:
   a valve body defining a main valve cavity and a smaller-diameter metering valve cavity, with a narrow interconnecting passage between them,
   said body providing said main valve cavity with a seat through which said interconnecting passage enters said main valve cavity,
   said metering valve cavity having an end wall through which said interconnecting passage leads and having a smooth axial bore leading from said end wall,
   said valve body also having first, second, and third inwardly extending openings, separated from each other,
   said first opening providing a valve inlet for connection to a source of high-pressure gas, an inlet-flow passage leading from said first opening into said axial bore and inlet-pressure passage also leading from said first opening,
   said second opening having a portion at its outer end connected by an annular shoulder to a small-diameter inner bore which is connected by a first by-pass conduit to said axial bore and is connected to a second by-pass conduit,
   said third opening providing a valve outlet,
   main valve means comprising a movable member cooperating with said main valve cavity for enclosing and varying in size a main valve chamber and having sealing means facing said seat, said main valve chamber being connected to said outlet and to said second by-pass conduit,
   a main spring in said main valve chamber with one end bearing against said main valve means and its other end bearing against said body and tending to force said main valve means away from said seat,
   closure means covering said main valve means and secured to said main body and cooperating with them to provide an outer chamber to which said inlet-pressure conduit leads, so as to exert pressure on the opposite side of said main valve means from said main valve chamber,
   a flow metering valve in said metering cavity having a tapered stem extending into said interconnecting passage and controlling flow, with the pressure drop from upstream to downstream of said metering valve increasing with increase in flow, said flow metering valve being movable in and sealing against said bore on the opposite side of said inlet passage and said first by-pass conduit from said end wall, and adjustable as to position in said metering valve cavity,
   a diaphragm in said second opening seated on said shoulder,
   a closure valve in said inner bore of said second opening with an inner end able to close said first by-pass conduit off from said second by-pass conduit, and a head at its outer end bearing against said diaphragm,
   a spring around said closure valve in said inner bore urging said valve normally away from closure,
   control means on the opposite side of said diaphragm from said closure valve, having a head bearing against said diaphragm, for acting through said diaphragm to move said closure valve toward and away from closure.

2. The valve of claim 1 wherein said control means comprises an assembly providing axial movement without rotary movement of said head.

3. A flow limit shutoff valve, including in combination:
   a valve body having an axially extending opening defining a wide main valve cavity at one end, a smaller-diameter metering valve cavity at the opposite end, and a narrow interconnecting passage connecting the two cavities and serving to admit high-pressure gas to said main valve cavity,
   said body providing said main valve cavity with an annular seat concentric with said interconnecting passage, which enters said main valve cavity at and through said seat, said seat being surrounded by a concentric well having an annular well shelf leading radially out to a well wall, said main valve cavity being surrounded by an outer annular shelf,
   said metering valve cavity extending in to an annular end wall concentrically surrounding said interconnecting passage and having a smooth axial bore leading from said end wall,
   said valve body also having first, second and third radially inwardly extending openings, angularly separated from each other,
   said first opening providing a valve inlet for connection to a source of high-pressure gas, with an inlet-flow passage leading through said body from the inner end of said first opening into said axial bore of said metering valve cavity, and an inlet-pressure passage leading away from said first opening,
   said second opening having a wider portion at its outer end connected by an annular shoulder to a small-diameter inner cylindrical bore, said inner bore being connected by a first by-pass conduit to the axial bore of said metering valve cavity and to a second by-pass conduit leading into said well,
   said third opening providing a valve outlet connected to said well by an outlet passage at its inner end,
   main valve means comprising a movable member cooperating with said main valve cavity for enclosing and varying in size a main valve chamber and having sealing means facing said seat,
   a main spring with one end bearing against said main valve means and its other end bearing against said well shelf and tending to force said main valve means away from said seat,
   a closure cap covering said main valve means and secured to said body and cooperating with them to provide an outer chamber to which said inlet-pressure passage leads, so as to exert pressure on the opposite side of said main valve means from said main valve chamber, flow metering means in said metering valve cavity having a tapered stem extending into said interconnecting passage with a narrow portion for flow therearound from said metering valve cavity into said interconnecting passage to said main valve cavity and a wider portion able to engage the end wall and seal off said interconnecting passage, said flow metering means being movable in and sealing against said bore on the opposite side of said inlet passage and said first by-pass conduit from said end wall, adjustable as to position in said metering valve cavity, a diaphragm in said second opening seated on said shoulder, a by-pass closure valve in said inner bore of said second opening with an inner end able to connect and close off said first by-pass conduit from said second by-pass conduit, and a head at its outer end bearing against said diaphragm, a spring around by-pass closure valve in said inner bore urging said by-pass closure valve away from said first by-pass conduit, thereby connecting said first by-pass conduit to said second by-pass conduit, control means in said wider portion of said second opening bearing against said diaphragm and manual adjustment for acting through said diaphragm to move said closure valve inwardly to close off said first by-pass conduit.

4. The valve of claim 3 wherein said control means includes means for acting axially against said diaphragm without causing rotary movement against said diaphragm.

5. A flow limit shutoff valve, including in combination:

a valve body having an axially extending opening defining a wide main valve cavity at one end, a smaller-diameter metering valve cavity at the opposite end, and a narrow interconnecting passage connecting the two cavities and serving to admit high-pressure gas to said main valve cavity, said main valve cavity having an annular seat concentric with said interconnecting passage, which enters said main valve cavity at and through said seat, a cylindrical seat periphery around said seat leading back toward said metering valve cavity around said interconnecting passage to an annular shelf surrounded by a concentric cylindrical wall leading further back to an annular well shelf leading out to a well wall that extends cylindrically in the direction away from said metering valve cavity and connected by a shoulder to a cylindrical bore, part of which is bounded by an annular extension, the other side of which defines an outer cylindrical portion leading back to an outer annular shelf having an annular recess, said body exterior around said main valve cavity having an exteriorly threaded portion, said metering valve cavity extending in to a flat annular end wall concentrically surrounding said interconnecting passage and having a smooth axial bore leading from said end wall, beyond which is an axial threaded portion, said valve body also having first, second, and third radially inwardly extending openings, angularly separated from each other, said first opening having a threaded bore for connection to a source of high-pressure gas and serving as the valve inlet, with an inlet-flow passage leading from the inner end of said first opening into said axial bore of said metering valve cavity, and an inlet-pressure passage leading from the inner end of said first opening through said outer annular shelf, said second opening having a larger diameter threaded portion at its outer end connected by an annular shoulder to a smaller-diameter inner cylindrical bore, said inner bore being connected by a first by-pass conduit to the axial bore of said metering valve cavity and by a second by-pass conduit to and through the well shelf of said main valve cavity, said third opening having a threaded outlet end and an inner end connected by an outlet passage to said well, a main valve member in said main valve cavity, comprising a piston having a sealing ring mounted for movement in the cylindrical bore of said main valve cavity and having a smaller-diameter portion extending toward said annular seat, and a sealing member secured to the end of said smaller-diameter portion facing said seat, a main spring with one end bearing against said main valve member and its other end bearing against said well shelf and tending to force said valve member away from said seat, a closure cap normally bearing against the piston at the outer limit thereof and engaging said outer shelf and having a portion threaded to said exterior threads, a sealing ring in the recess of said outer shelf and sealing against leakage between said cap and said body, a metering valve member in said metering valve cavity having a tapered stem extending into said interconnecting passage with a narrow portion for flow therearound from said metering valve cavity into said interconnecting passage to said main valve cavity and a wider portion able to engage the end wall and seal off said interconnecting passage, said metering valve member having a piston portion with an O-ring sealing against said bore on the opposite side of said inlet passage and said first by-pass conduit from said end wall, said metering valve member having a threaded portion engaging the threaded portion of the metering valve cavity, for adjustment thereof, a diaphragm in said second opening seated on said shoulder, a closure valve in said inner bore of said second opening with an inner end able to close off said first by-pass conduit from said second by-pass conduit and a head at its outer end bearing against said diaphragm, a spring around said closure valve in said inner bore urging said closure valve normally away from closure, and a control member in said threaded portion of said second opening having a head bearing against said diaphragm, and adjustment means threaded into said threaded portion for forcing said control member to move inwardly and to force said diaphragm to move said closure valve inwardly for closure.

6. The valve of claim 5 wherein said control member comprises an assembly for moving said head axially without rotation of said head.

7. A flow limit shutoff valve, including in combination:
- a valve body having an axially extending opening defining a wide main valve cavity at one end, a smaller-diameter metering cavity at the opposite end, and a narrow interconnecting passage connecting the two cavities and serving to admit high-pressure gas to said main valve cavity,
- said main valve cavity having an annular seat concentric with said interconnecting passage, which enters said main valve cavity at and through said seat, a cylindrical seat periphery around said seat leading back toward said metering valve cavity around said interconnecting passage to an annular shelf surrounded by a concentric cylindrical wall leading further back to an annular well shelf leading out to a well wall that extends cylindrically in the direction away from said metering valve cavity and connected to an outer annular shelf, said body exterior around said main valve cavity having an exteriorly threaded portion,
- said metering valve cavity extending in to a flat annular end wall concentrically surrounding said interconnecting passage and having a smooth axial bore leading from said end wall, beyond which is an axial threaded portion,
- said valve body also having first, second, and third radially inwardly extending openings, angularly separated from each other,
- said first opening having a threaded bore for connection to a source of high-pressure gas and serving as the valve inlet, with an inlet-flow passage leading from the inner end of said first opening into said axial bore of said metering cavity, and an inlet-pressure passage leading from the inner end of said first opening through said outer annular shelf,
- said second opening having a larger diameter threaded portion at its outer end connected by an annular shoulder to a small-diameter inner cylindrical bore, said inner bore being connected by a first by-pass conduit to the axial bore of said metering valve cavity and connected to a second by-pass conduit, leading to said well shelf,
- said third opening having a threaded outlet end and an inner end connected by an outlet passage to said well,
- a main valve member in said main valve cavity, comprising a first diaphragm secured at its periphery to said outer annular shelf, a diaphragm plate on which said first diaphragm bears having a smaller-diameter extension extending toward said annular seat, and a sealing member secured to the end of said smaller-diameter portion facing said seat, said first diaphragm having a hole therethrough aligned with said inlet pressure passage to said outer annular shelf,
- a main spring with one end bearing against said main valve member and its other end bearing against said well shelf and tending to force said valve member away from said seat,
- a closure cap defining an outer chamber on the outer side of said first diaphragm, into which said inlet pressure passage leads, through said hole in said first diaphragm, and having a portion threaded to said exterior threads,
- a metering flow member in said metering valve cavity having a tapered stem extending into said interconnecting passage with a narrow portion for flow therearound from said metering valve cavity into said interconnecting passage to said main valve cavity and a wider portion able to engage the end wall and seal off said interconnecting passage, said metering member having a piston portion with an O-ring sealing against said bore on the opposite side of said inlet passage and said first by-pass conduit from said end wall, said metering flow member having a threaded portion engaging the threaded portion of the metering valve cavity, for adjustment thereof,
- a second diaphragm in said second opening seated on said shoulder,
- a closure valve in said inner bore of said second opening with an inner end able to close off said first by-pass conduit from said second by-pass conduit and a head at its outer end bearing against said second diaphragm,
- a spring around said closure valve in said inner bore urging said closure valve normally away from closure, and
- a control member in said threaded portion of said second opening having a head bearing against said second diaphragm, and adjustment means threaded into said threaded portion for forcing said control member to move inwardly and to force said second diaphragm to move said closure valve inwardly for closure.

8. The valve of claim 7 wherein said closure cap comprises a central disc member clamping against said first diaphragm and a collar threaded to said exterior threads, so as to clamp on said first diaphragm without twisting it.

9. The valve of claim 7 wherein said control member comprises an assembly providing means for moving said head axially without rotating it.

* * * * *